J. WHIPPS.
HARROW TOOTH.
APPLICATION FILED SEPT. 7, 1910.
985,871.
Patented Mar. 7, 1911.
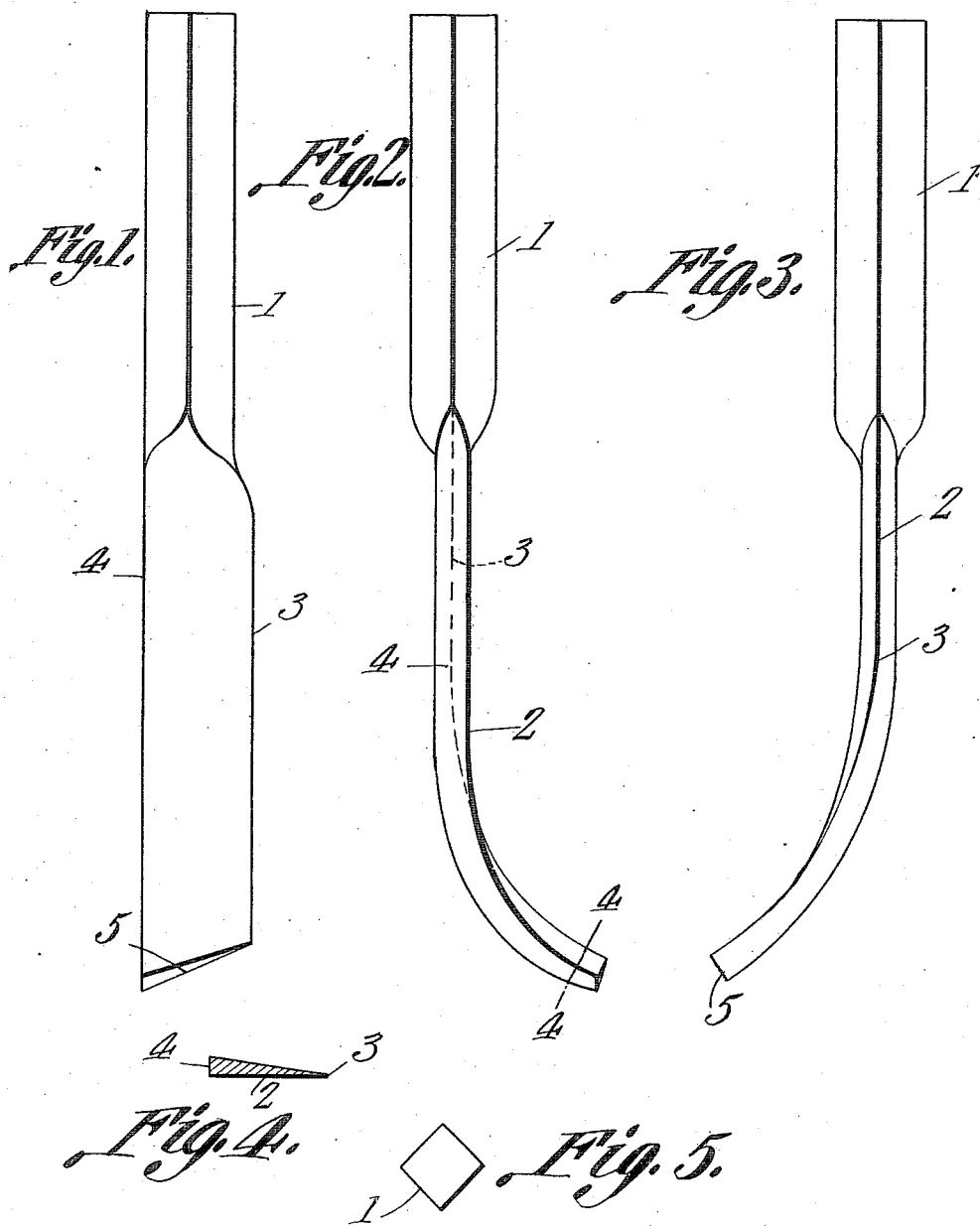
James Whipps, Inventor
by C. A. Snow & Co.
Attorneys
Witnesses

UNITED STATES PATENT OFFICE.

JAMES WHIPPS, OF CARLISLE, INDIANA.

HARROW-TOOTH.

985,871. Specification of Letters Patent. Patented Mar. 7, 1911.

Application filed September 7, 1910. Serial No. 580,827.

*To all whom it may concern:*

Be it known that I, JAMES WHIPPS, a citizen of the United States, residing at Carlisle, in the county of Sullivan and State of Indiana, have invented a new and useful Harrow-Tooth, of which the following is a specification.

This invention relates to a harrow tooth and consists in the novel configuration of the same as hereinafter shown, described and claimed.

The object of the invention is to provide in the form of a unitary structure a harrow tooth having a shank portion of usual pattern whereby the tooth may be applied to any harrow frame in general use, the said teeth having a lower portion of peculiar configuration adapted to cut into the upper portion of the soil without materially disturbing or turning the same, but at the same time effectually reducing the soil to pulverized state preparatory to subsequent rolling and planting.

In the accompanying drawing, Figure 1 is a side elevation of the harrow tooth. Fig. 2 is a rear edge elevation of the same. Fig. 3 is a front edge elevation of the same. Fig. 4 is a transverse sectional view of the lower portion of the harrow tooth cut on the line 4—4 of Fig. 2. Fig. 5 is an end view of the harrow tooth.

The harrow tooth is formed from a section or bar which in its original condition is of the same transverse sectional area throughout its entire length. The harrow tooth is forced or pressed up into its final state and is not twisted as is commonly the practice. The bar or blank from which the tooth is formed is provided with the upper shank portion 1 which is rectangular in transverse section. A blade portion 2 is formed at the lower end portion of the shank 1. The blade portion 2 is provided with a forward cutting edge 3 the upper portion of which is in alinement with the forward corner of the shank portion 1. The said cutting edge 3 and the blade 2 toward the lower end of the teeth are curved in a lateral direction. It makes no difference to which side the said curvature is made as teeth of either pattern may be provided. The upper portion of the back 4 of the blade 2 is in vertical alinement with the rear corner of the shank portion 1 of the harrow tooth and the said back 4 in a similar manner as that described in connection with the cutting edge 3 is curved to one side or the other of a medial plane passing through the shank portion 1 of the harrow tooth.

As has been hereinbefore stated, the harrow tooth is made from a section of bar which is of the same transverse sectional area throughout and the blade portion 2 is formed at the lower end of the shank portion 1 by forging or pressure; therefore the material in the said blade portion 2 is of the same transverse sectional area throughout the length of the said blade and the same transverse sectional area as the material contained in the shank portion 1. The edge 3 describes a shorter curve than the curvature of the back 4, consequently the tip 5 of the harrow tooth is so disposed that the said tip may lie in a line parallel with a horizontal line when the harrow tooth is in position in a harrow frame or bar and at an acute angle to the surface of the ground. Thus when a harrow is equipped with a series of teeth as described the upper portions of the cutting edge 3 will operate in the surface of the soil and make an incision while the lower portion of the cutting edge 3 will operate below the surface of the soil and open a curved incision therein but the shape of the blade 2 is such that the soil will not be dragged or spaded but will be loosened and left approximately in its original location but in a condition adapted to receive subsequent treatment preparatory to planting.

Having described the invention what I claim as new and desire to secure by Letters Patent is:

A harrow tooth formed from a bar of uniform transverse sectional area throughout its length and provided at its upper end with a shank portion which is rectangular in transverse section, and a blade forged at the lower end of the shank and provided with a cutting edge, the upper portion of which is in alinement with the forward corner of the shank portion, the upper portion of the back of the blade having its median line in alinement with the rear corner of the shank of the tooth, the lower portion together with the cutting edge and back being curved laterally.

In testimony that I claim the foregoing as my own, I have hereto affixed my signature in the presence of two witnesses.

JAMES WHIPPS.

Witnesses:
JAMES R. PILMER,
SALATHIEL BOONE.

Copies of this patent may be obtained for five cents each, by addressing the "Commissioner of Patents, Washington, D. C."